United States Patent [19]

Sato et al.

[11] Patent Number: 5,583,999
[45] Date of Patent: Dec. 10, 1996

[54] BUS ARBITER AND BUS ARBITRATING METHOD

[75] Inventors: Masami Sato, Ishikawa; Yuichi Goto, Kawasaki, both of Japan

[73] Assignee: Fujitsu Limited, Kawasaki, Japan

[21] Appl. No.: 354,169

[22] Filed: Dec. 8, 1994

[30] Foreign Application Priority Data

Jan. 14, 1994 [JP] Japan .................................... 6-002811
Nov. 30, 1994 [JP] Japan .................................... 6-296827

[51] Int. Cl.$^6$ ............................................ G06F 13/00
[52] U.S. Cl. .......................... 395/280; 395/291; 395/293; 395/294; 395/296
[58] Field of Search .................................. 395/291, 293, 395/294, 297, 280, 296

[56] References Cited

U.S. PATENT DOCUMENTS 4,663,756  5/1987  Retterath .
4,947,368  8/1990  Donaldson et al. ..................... 364/900
5,388,228  2/1995  Heath et al. ............................. 395/325

FOREIGN PATENT DOCUMENTS 625753       11/1994  European Pat. Off. .
WO84/00220    1/1984  WIPO .

*Primary Examiner*—Jack B. Harvey
*Assistant Examiner*—John Travis
*Attorney, Agent, or Firm*—Staas & Halsey

[57] ABSTRACT

A plurality of priority determining units determine a bus use among a plurality of bus masters on the basis of bus request signals respectively from the bus masters and thereby generate bus grant signal. A bus request allocation unit allocates each bus request signals to one or more priority determining units on the basis of an allocation signal indicating which one or more priority determining units, among the plurality of priority determining units, to receive an allocation of the bus request signals from the plurality of bus masters. A control unit supplies the allocation signal to the bus request allocation unit and operates one or more priority determining units based on the allocation signal.

18 Claims, 15 Drawing Sheets

BUS ARBITER AND BUS ARBITRATING METHOD

BACKGROUND OF THE INVENTION

The present invention relates to a bus arbiter for and a bus arbitrating method of arbitrating a bus among a plurality of bus masters.

In recent years, with a speed-up of processing in a communications system and in an I/O device, the processing of bus masters connected to the bus of a computer system is also speeded up. Connected, consequently, in mixture to the bus are the communications system and I/O device that perform the processing at a high speed, and the communications system and I/O device that perform the processing at a low speed.

On the other hand, the computer system is diversified, and a variety of combinations of the communications systems and the I/O devices are connected to the single line of bus.

Since each bus master uses one bus, the bus is allocated to each bus master. The bus is allocated to each bus master by a bus arbiter for arbitrating the bus with respect to bus request signals transmitted from the plurality of bus masters.

Each of the plurality of bus masters has a different data transfer velocity. Each bus master has to transfer the data within a predetermined time. For this reason, the bus arbiter is required to flexibly change an allocation of the bus to the respective bus masters.

Herein, the way of allocating the bus will be discussed in detail. The bus arbiter is constructed of priority determining units and a bus service holding unit. The priority determining unit determines the allocation of the bus to each of the bus masters by a logic operation.

The priority determining unit takes any one of a linear method and a round robin method. The linear method is a method of prioritizing the bus with respect to the individual bus masters. The round robin method is a method of evenly allocating the bus to each bus master at every bus cycle.

When each of the bus masters transmits a bus request signal to the bus arbiter, the bus arbiter outputs a bus grant signal for permitting only one of the plurality of bus masters to acquire the bus.

Started is a bus cycle of the bus master acquiring the bus. Then, the bus cycle is terminated by an acknowledge response ACK indicating a recognition of the bus master acquiring the bus from a bus slave.

In the prior art bus arbiter, however, the priority determining unit determines, when designed, the allocation of the bus to each bus master. Hence, there arise the following problems.

In the case of adopting the linear method, the bus master exhibiting a high data transfer velocity is connected to a location of a high priority. That is, the bus master undergoes a constraint in terms of a physical position.

Further, in the case of adopting the round robin method, the bus is evenly allocated to each bus master. For this reason, the bus master may be connected in any position.

A bus transfer capability is evenly allocated to each bus master. Therefore, the bus master coming down to the lowest-order has to wait for a time equivalent to the number of bus cycles, which number corresponds to the number obtained by subtracting 1 from the number of bus masters, in order to acquire the bus.

Each of the bus masters, however, has such a constraint that the bus master has to transfer the data within the predetermined time. The maximum transfer capability is therefore confined to the above predetermined time. For this reason, the number of bus masters is limited.

As explained above, in the conventional bus arbiter, the number of bus masters and the physical connecting positions thereof are limited corresponding to the allocation of the bus. Also, the bus arbiter can not be diverted to buses of other computer systems.

SUMMARY OF THE INVENTION

It is an object of the present invention to provide a bus arbiter and a bus arbitrating method that are capable of corresponding to a case where a computer system is changed without being limited to the number of bus masters and physical positions thereof.

The bus arbiter according to this invention arbitrates a bus among a plurality of bus masters on the basis of bus request signals supplied from the plurality of bus masters and outputting a bus grant signal to the bus master acquiring the bus. The bus arbiter comprises a plurality of priority determining units, a bus request allocation unit and a control unit.

The plurality of priority determining units determine the priority of the bus masters on the bus on the basis of the bus request signals from the plurality of bus masters and thereby generate the bus grant signal.

The bus request allocation unit allocates the bus request signals to one or more priority determining units on the basis of an allocation signal for indicating which one or more priority-determining units, among the plurality of priority determining units, to receive an allocation of the bus request signals from the plurality of bus masters.

The control unit supplies the allocation signal to the bus request allocation unit and operates one or more priority determining units based on the allocation signal.

Further, the bus arbiter further comprises a bus service holding unit. The bus service holding unit holds the bus grant signal supplied from one or more priority determining units operated by the control unit and outputs the held bus grant signal to the bus master acquiring the bus.

The control unit includes an enable unit. The enable unit generates an enable signal for indicating an operation of one or more priority determining units on the basis of the bus request signals allocated from the bus request allocation unit.

The control unit includes a control register. The control register stores plural items of bit data corresponding to a data quantity of the plurality of bus request signals as the allocation signal and, designates the priority determining unit to which each bus request signal should be allocated on the basis of a value of each bit.

Each of the plurality of priority determining units includes a priority storage unit and a round robin unit. The priority storage unit stores priority data for evenly allocating the bus based on the priority of the plurality of bus masters.

The round robin unit evenly allocates the bus grant signals to the bus masters at every cycle on the basis of the priority data stored in the priority storage unit.

The priority storage unit stores, as an item of priority data, a bus grant signal for the bus master using the bus at the previous bus cycle.

The round robin unit is constructed of the same number of priority encoders as the number of the plurality of bus masters.

Each of the priority encoders has such a priority level that the priority of the bus master on the bus corresponding to the priority encoder itself comes to the highest-order. The priority encoders are sequentially selected based on the bus grant signals at the previous bus cycle which are stored in the priority storage unit.

At a bus cycle next to the previous bus cycle, there is selected such a priority storage unit that the priority of the bus master previously using the bus comes down to the lowest-order.

The control register, further, stores a switching signal for switching a round robin operation of sequentially selecting each of the plurality of priority encoders provided in each of the priority determining units and a linear operation of fixedly selecting any one of the priority encoders.

The priority storage unit performs an operation corresponding to the switching signal.

With respect to the two priority determining units among the plurality of priority determining units, one priority determining unit evenly allocates the bus based on the priority of the bus masters on the bus corresponding to the bus request signals inputted by the allocation signals in accordance with the round robin operation based on the switching signal.

The other priority determining unit gives a priority level of the bus masters on the bus corresponding to the bus request signals inputted by the allocation signals in accordance with the linear operation based on the switching signal.

Further, a bus arbitrating method according to the present invention is to arbitrate a bus among a plurality of bus masters on the basis of bus request signals supplied from the plurality of bus masters and output a bus grant signal to the bus master acquiring the bus.

The bus arbitrating method comprises a determining step, an allocating step and a controlling step. The determining step is to cause a plurality of priority determining units to determine the priority of the bus masters on the bus on the basis of the bus request signals from the plurality of bus masters and thereby generate the bus grant signal.

The allocating step is to allocate the bus request signals to one or more priority determining units on the basis of an allocation signal for indicating which one or more priority determining units, among the plurality of priority determining units, to receive an allocation of the bus request signals from the plurality of bus masters.

The controlling step is to generate the allocation signal and operate one or more priority determining units based on the allocation signal.

According to the present invention, to start with, the plurality of bus masters supply the bus request signals to the bus request allocation unit. The control unit supplies the bus request allocation unit with the allocation signal, and, thereupon, the bus request allocation unit allocates the plurality of bus request signals to any one or more priority determining units on the basis of the allocation signal.

Then, the control unit operates one or more priority determining units to which the bus request signals are allocated.

For example, the bus request allocation unit allocates a first bus request signal to a first priority determining unit. The bus request allocation unit allocates a second bus request signal to a second priority determining unit. The bus request allocation unit allocates a third bus request signal to a third priority determining unit.

These priority determining units generate the bus grant signals by determining the priority of the bus use.

With this operation, the bus use is prioritized in the same sequence as that by the linear method, like this: the first bus master, the second bus master and the third bus master.

Further, the bus request allocation unit allocates the third bus request signal to the first priority determining unit. The bus request allocation unit allocates the second bus request signal to the second priority determining unit. The bus request allocation unit allocates the first bus request signal to the third priority determining unit.

With this operation, the priority of the bus use is prioritized in this sequence: the third bus master, the second bus master and the first bus master.

Further, the bus request allocation unit allocates the first bus request signal to the first priority determining unit. The bus request allocation unit allocates the second and third bus request signals to the second priority determining unit.

At this time, if these priority determining units prioritize the bus use according to the round robin method, with respect to the priority of the bus, the first bus master has a priority level, and the bus is evenly allocated to the second and third bus masters.

In this way, the priority of the bus use is set in a programmable manner. Also, the bus use is flexibly allocated. For this reason, even the bus master of the lowest-order does not have to wait for a long period of time.

Consequently, the number of bus masters and the physical connecting positions of the bus masters are not limited. Further, the bus arbiter can correspond to a change of the computer system and can be also diverted to other computer systems.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

Specific embodiments of the present invention will hereinafter be discussed.

EMBODIMENT 1

Figure 1:
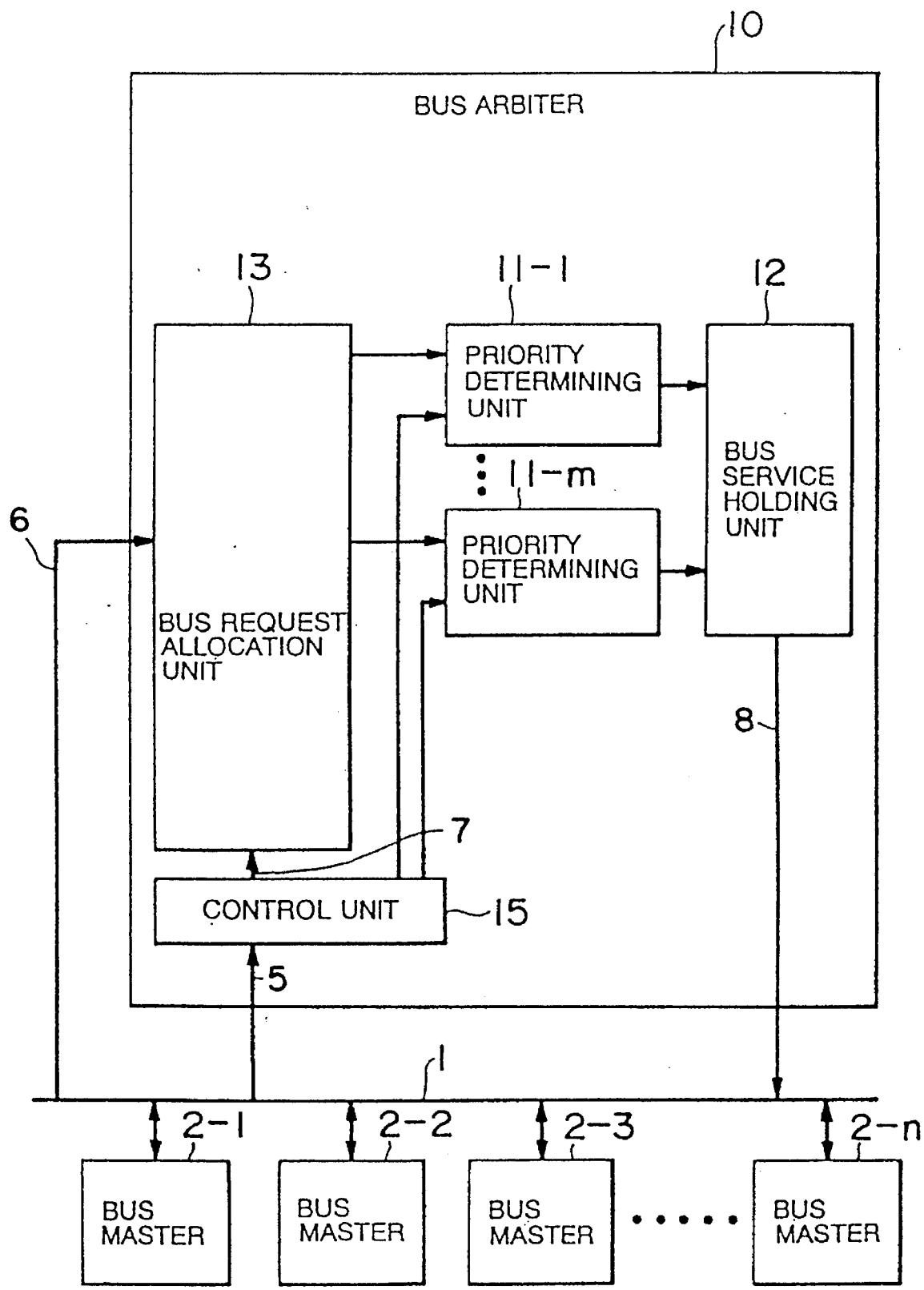
FIG. 1 is a block diagram illustrating a configuration of a bus control system including a bus arbiter in accordance with an embodiment 1 of the present invention.

FIG. 1 is a block diagram illustrating a configuration of a bus control system including a bus arbiter in accordance with an embodiment 1 of the present invention. The bus control system is provided with a bus 1. Connected to the bus 1 are a plurality of bus masters 2-1 to 2-n and a bus arbiter 10.

Each of the plurality of bus masters 2-1 to 2-n issues a bus request signal 6 to the bus arbiter 10. The bus arbiter 10 arbitrates the bus 1 among the plurality of bus masters 2-1 to 2-n on the basis of the bus request signals from the plurality of bus masters 2-1 to 2-n and then outputs a bus grant signal 8 to the arbitrated bus master.

The bus arbiter 10 has a plurality of priority determining units 11-1 to 11-m, a bus request allocation unit 13, a bus service holding unit 12 and a control unit 15.

Each of the plurality of priority determining units 11-1 to 11-m determines the priority of a bus use on the basis of the bus request signals from the plurality of bus masters 2-1 through 2-n, thereby generating the above-mentioned bus grant signal 8. The bus request allocation unit 13 is provided between the bus 1 and the plurality of priority determining units 11-1 to 11-m.

The bus request allocation unit 13 allocates the individual bus request signals to any one or more priority determining units on the basis of the allocation signal 7 indicating the one or more priority determining units to which the bus request signals supplied respectively from the plurality of bus masters 2-1 through 2-n should be allocated. The control unit 15 is provided between the bus request allocation unit 13 and the bus 1.

The control unit 15 supplies the allocation signal 7 to the bus request allocation unit 13 and, at the same time, operates the one or more priority determining units to which the allocation signal are inputted. The bus service holding unit 12 is connected to the plurality of priority determining units 11-1 to 11-m.

The bus service holding unit 12 holds the bus signal supplied from one or more priority determining units that are thus operated and, simultaneously, outputs the held bus grant signal 8 to the bus masters which have acquired the bus.

Figure 2:
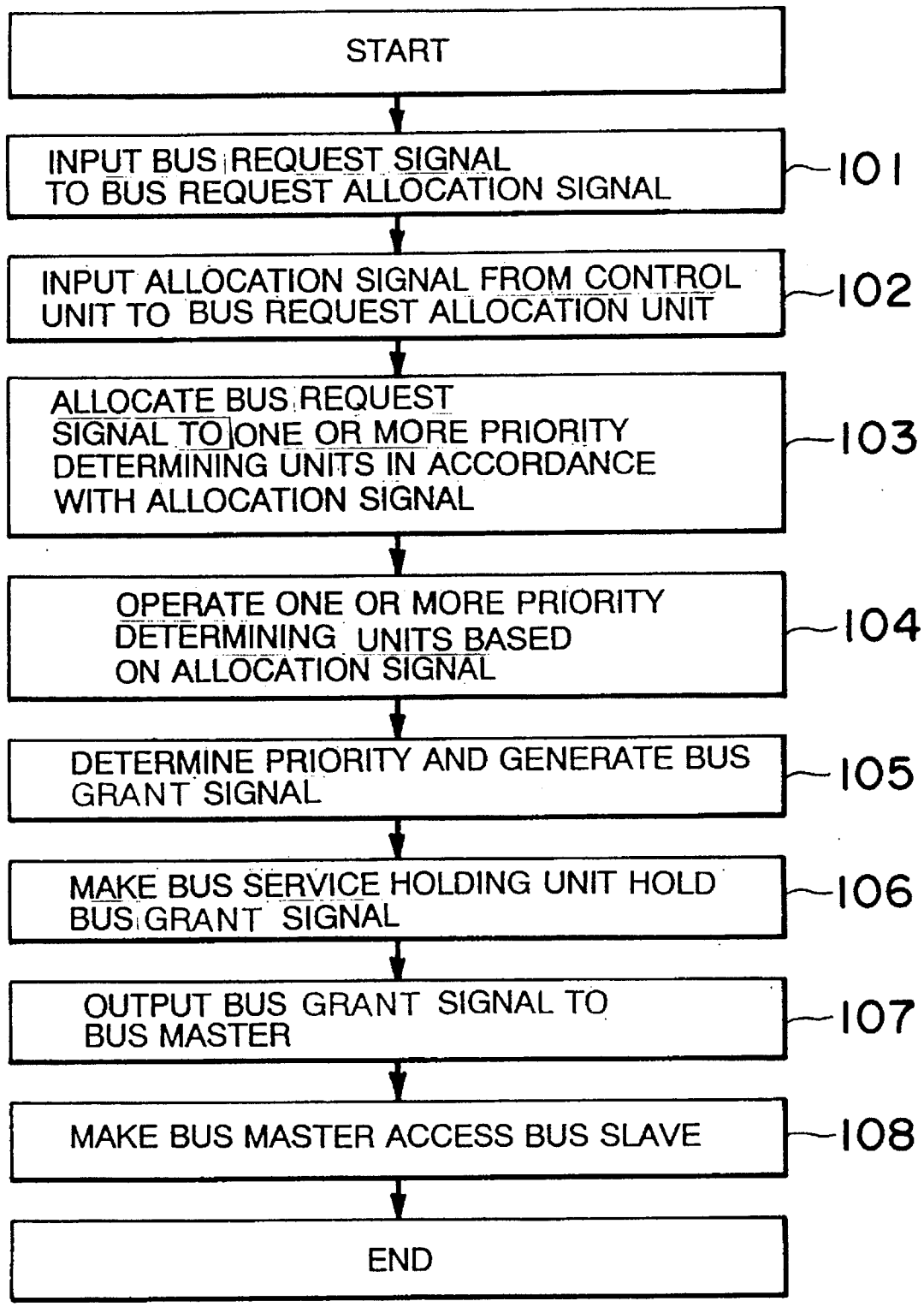
FIG. 2 is a flowchart showing the operation of the bus arbiter in accordance with the embodiment 1 of this invention.

Given next is an explanation of the operation of the bus arbiter in accordance with the embodiment 1 of the present invention. FIG. 2 is a flowchart showing the operation of the bus arbiter. The operation of the bus arbiter and the bus arbitrating method will be explained with reference to this flowchart.

First, the bus allocation unit 13 is supplied with the respective bus request signals from a plurality of bus masters 2-1 through 2-n (step 101).

The control unit 15 supplies the allocation signal 7 to the bus request allocation unit 13 (step 102). The bus request allocation unit 13 allocates the bus request signals to one or more priority determining units on the basis of the allocation signal 7 (step 103).

Then, the control unit 15 operates the priority determining units to which the bus request signals are allocated (step 104).

For instance, the bus request allocation unit 13 allocates a bus request signal RE1 issured from the bus master 2-1 to the priority determining unit 11-1. The bus request allocation unit 13 allocates a bus request signal RE2 issured from the master 2—2 to the priority determining unit 11-2. The bus request allocation unit 13 allocates a bus request signal RE3 issured from the master 2-3 to the priority determining unit 11-3.

Thereupon, the priority determining units 11-1 to 11-3 generate the bus signal by determining the priority of the use of bus 1 (step 105).

In this case, the use of bus 1 is prioritized in this sequence: the bus master 2-1, the bus master 2—2 and the bus master 2-3. That is, this sequence is the same with the linear method.

Further, the bus service holding unit 12 holds the bus grant signal 8 transmitted from the operated priority determining units (step 106). The bus service holding unit 12 outputs the bus grant signal 8 to the bus masters which have acquired the bus 1 (step 107).

Moreover, the bus master acquiring the bus accesses an unillustrated bus slave (step 108).

In this way, the priority of the use of bus 1 is set in a programmable manner. Further, the bus use is flexibly allocated. For this reason, there is eliminated a necessity for even the lowest-order bus master 2 to wait long.

With this construction, the number of bus masters and physical connecting positions of the bus masters are not limited. Also, the bus arbiter is capable of corresponding to a change of a computer system and, further, can be diverted to other computer systems.

Note that the bus request allocation unit 13 allocates the bus request signal RE3 to the priority determining unit 11-1 by setting the above allocation signal. The bus request allocation unit 13 allocates the bus request signal RE2 to the priority determining unit 11-2.

The bus request allocation unit 13 may allocate the bus request signal RE1 to the priority determining unit 11-3.

In this instance, the priority of the bus use can be set in this sequence: the bus master 2-3, the bus master 2—2 and the bus master 2-1.

EMBODIMENT 2

Figure 3:
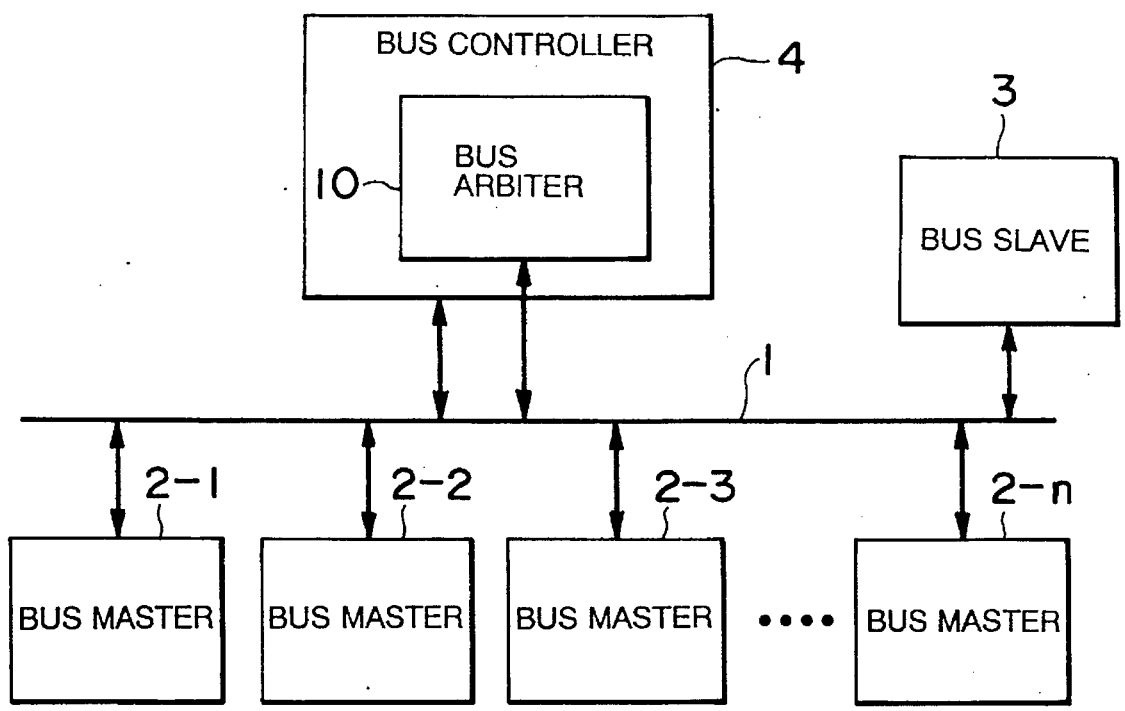
FIG. 3 is a block diagram illustrating a configuration of the bus control system inclusive of the bus arbiter and a bus controller in accordance with an embodiment 2 of this invention.

Next, the bus arbiter and a bus controller in accordance with an embodiment 2 of this invention will be explained. FIG. 3 is a block diagram illustrating a bus control system inclusive of the bus arbiter and the bus controller.

Referring again to FIG. 3, a plurality of bus masters 2-1 to 2-n, a bus slave 3 and a bus controller 4 are connected to the bus 1. The bus controller 4 controls the bus 1 but has a bus arbiter 10.

Each of the plurality of bus masters 2-1 to 2-n issues the bus request signal 6 to the bus arbiter 10. The bus arbiter 10 arbitrates the use of bus 1 among the plurality of bus masters 2-1 to 2-n on the basis of the bus request signals transmitted from the plurality of bus masters 2-1 to 2-n and then outputs the bus grant signal to the arbitrated bus master.

The bus slave 3 is accessed by the bus master acquiring the bus via the bus 1 in accordance with the bus grant signal.

Figure 4:
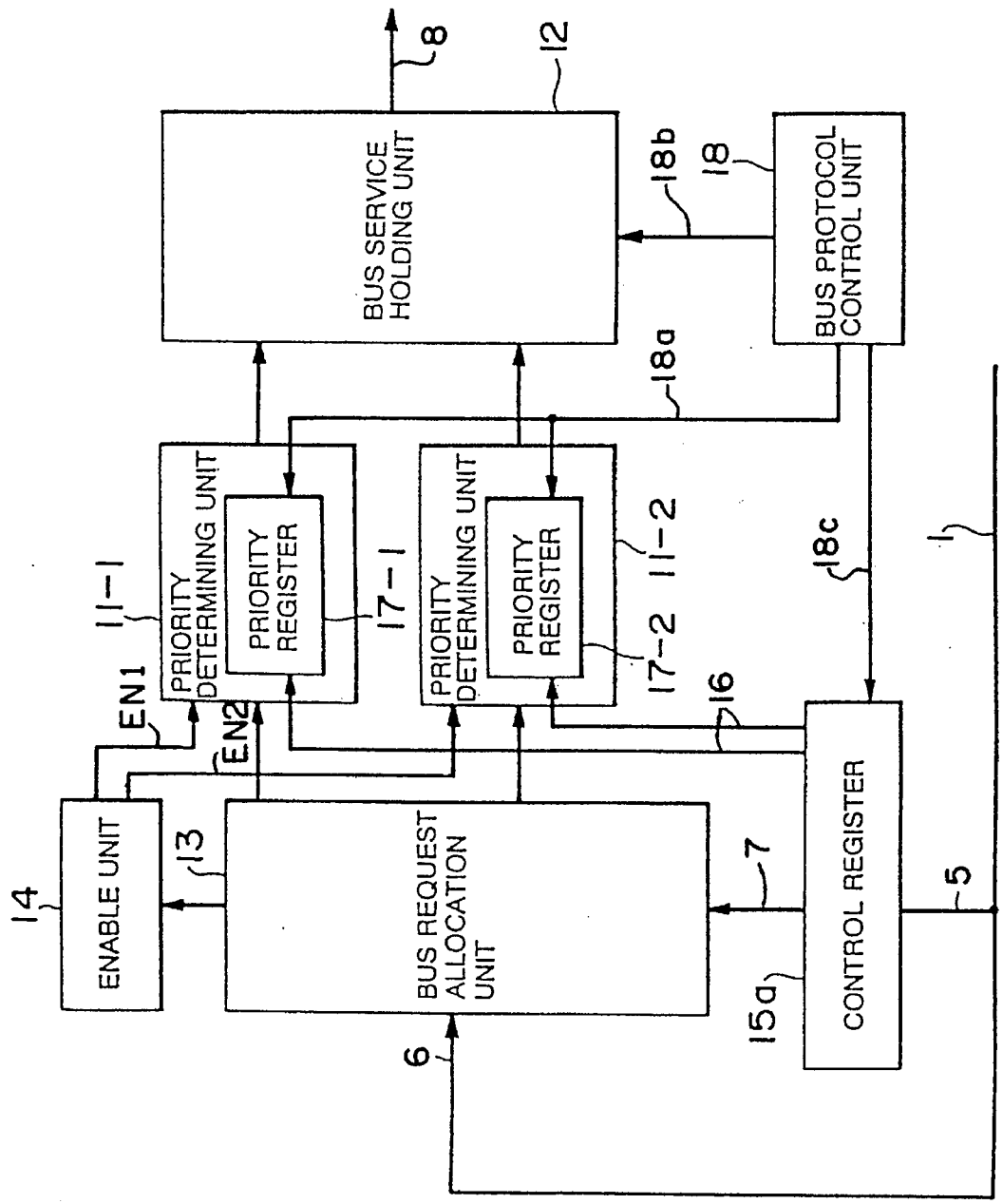
FIG. 4 is a block diagram illustrating a configuration of the bus arbiter in accordance with the embodiment 2 of this invention.

FIG. 4 is a block diagram showing the bus arbiter in accordance with the embodiment 2 of this invention. The bus arbiter 10 arbitrates the use of bus 1 among, e.g., eight units of bus masters 2-1 through 2-8.

The bus arbiter 10 employs the round robin method or the linear method in order to arbitrate the bus among the respective bus masters.

Figure 5:
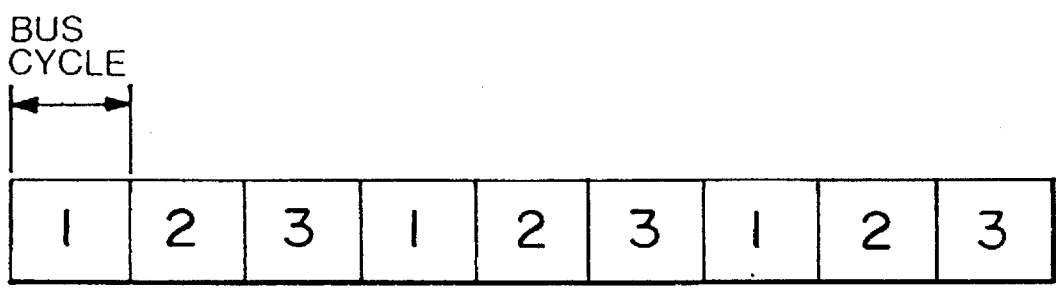
FIG. 5 is a diagram showing a format based on a round robin method in the embodiment 2.

FIG. 5 is a diagram showing a format based on the round robin method. In the example shown in FIG. 5, for instance, three units of bus masters acquire the bus according to the round robin method. In this case, the bus arbiter 10 evenly allocates the bus use to the bus masters 2-1, 2—2 and 2-3 in sequence.

Accordingly, at the first bus cycle, the bus arbiter 10 arbitrates the bus use among the three bus masters and outputs the bus grant signal to the bus master 2-1. The bus master 2-1 acquires the bus.

At the next bus cycle, the bus master 2—2 turns out to be the highest-order bus master, whereas the bus master 2-1 becomes the bus master of the lowest-order. Consequently, the bus master 2—2 gets the bus.

Based on the round robin method, the bus arbiter 10 cyclically switches the bus from the bus master 2-1 up to the bus master 2-3 at every bus cycle.

Figure 6:
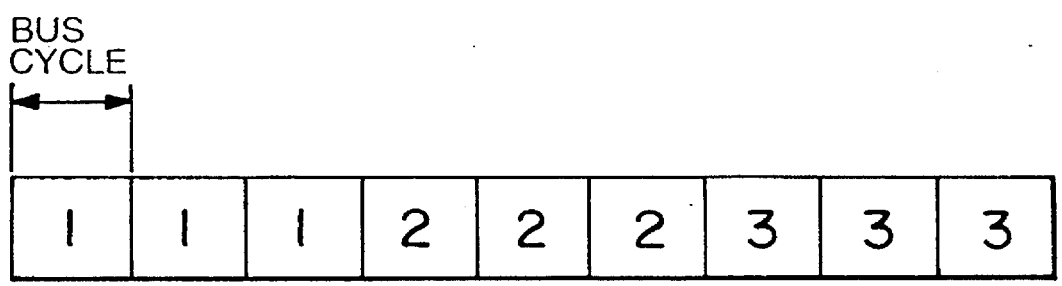
FIG. 6 is a diagram showing a format based on a linear method in the embodiment 2.

FIG. 6 is a diagram showing a format based on the linear method. According to the linear method, a priority level for bus use is given to each of the plurality of bus masters. The bus arbiter 10, according to the linear method, arbitrates the bus among, e.g., the three bus masters over the first three bus cycles and consequently outputs the bus signal to the bus master 2-1. The bus master 2-1 acquires the bus over the first three bus cycles.

The bus use arbiter 10 arbitrates the bus among the three bus masters over the next three bus cycles. The bus master 2—2 acquires the bus over the next three bus cycles.

The bus arbiter 10 is, as depicted in FIG. 4, constructed of the priority determining units 11-1 and 11-2, the bus service holding unit 12, the bus request allocation unit 13, an enable unit 14, a control register 15a and a bus protocol control unit 18.

The bus request allocation unit 13 allocates the bus request signals supplied from, e.g., eight units of bus masters 2-1 to 2-8 to the priority determining units 11-1 and 11-2 on the basis of allocation signal 7 outputted from the control register 15a.

Figure 7:
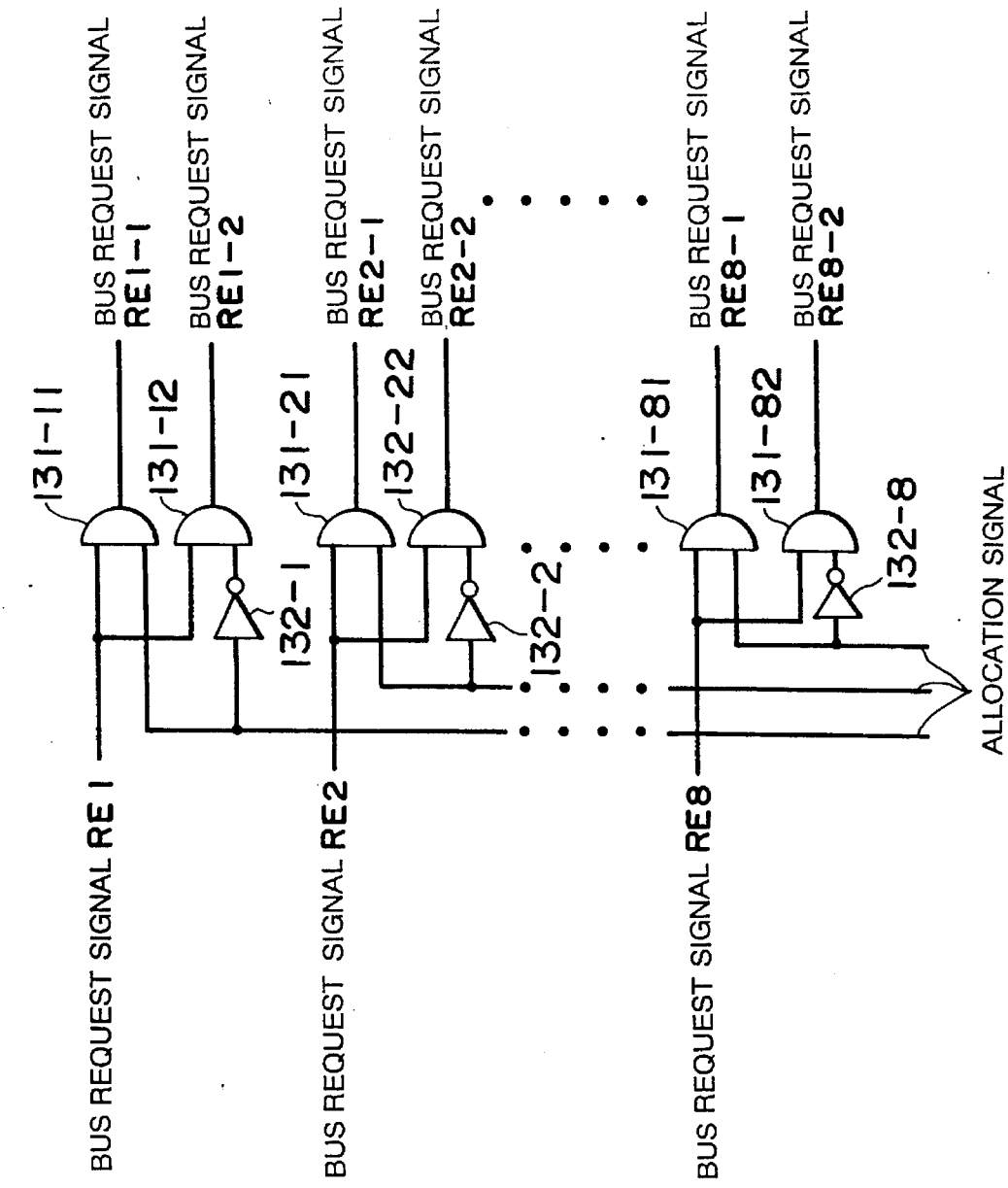
FIG. 7 is a block diagram illustrating a bus request allocation unit in the embodiment 2.

FIG. 7 is a diagram illustrating a configuration of the bus request allocation unit 13. Referring to FIG. 7, the bus request allocation unit 13 has two AND gates 131-ij and one inverter 132-i, corresponding to individual bus request signals REi.

Herein, i is one of values of 1 through 8, and j is 1 or 2. Note that the bus request signal is known as a bus request.

The bus request signal REi and the allocation signal are ANDed by the AND gate 131-i1. The AND gate 131-i1 outputs the bus request signal REi-1 as an output of AND to the priority determining unit 11-1.

The inverter 132-i for inverting the allocation signal is connected to the AND gate 131-i2. The AND gate 131-i2 obtains the AND of the bus request signal REi and the allocation signal inverted by the inverter 132-i.

The AND gate 131-i2 outputs the bus request signal REi-2 as an AND output to the priority determining unit 11-2.

Note that the allocation signal 7 is a signal having 8 bits equal to the number, i.e., eight pieces of the bus request signals RE1 to RE8.

Figure 8:
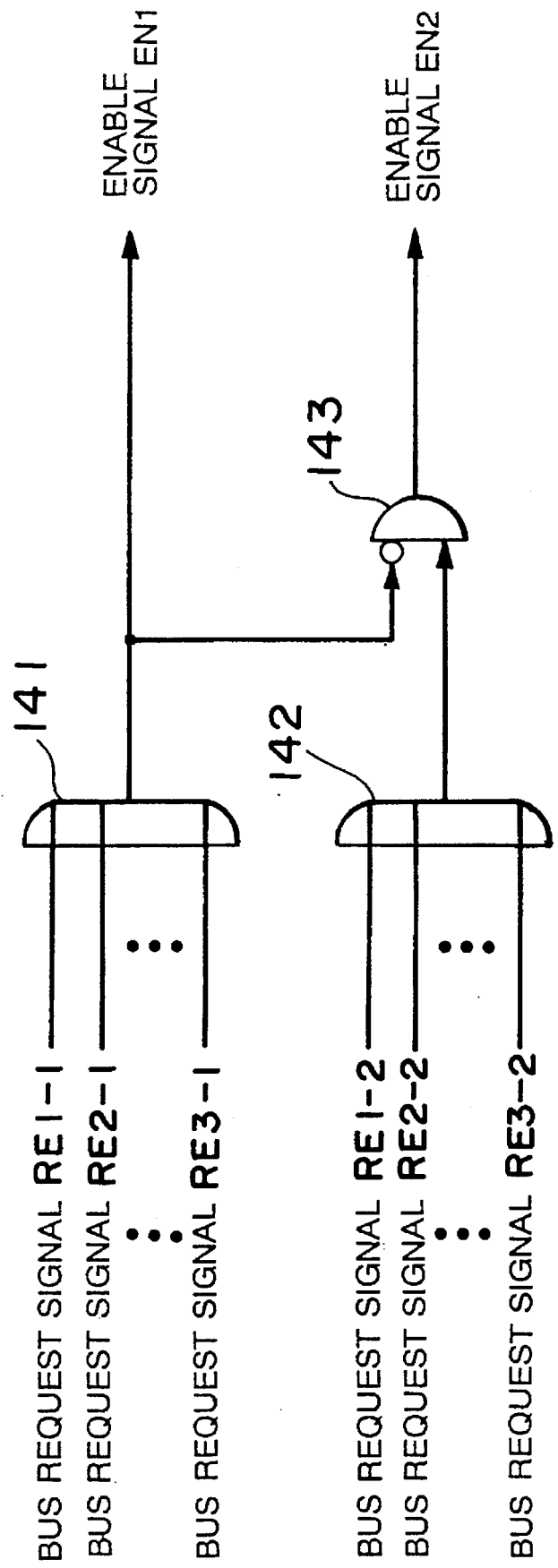
FIG. 8 is a block diagram illustrating an enable unit in the embodiment 2.

FIG. 8 is a diagram showing the enable unit 14. Referring to FIG. 8, the enable unit 14 is composed of OR gates 141 and 142 and a logic circuit 143. The eight bus request signals REi-1 (i=1 to 8) supplied from the bus request allocation unit 13 are ORed by the OR gate 141. The OR gate 141 outputs an enable signal EN1 as an OR output to the priority determining unit 11-1.

The OR gate 142 obtains the OR of the eight bus request signals REi-2 (i=1 to 8) supplied from the bus request allocation unit 13. An output of the OR gate 142 and an inverted output into which the output of the OR gate 141 is inverted are ANDed by the logic circuit 142. The logic circuit 143 outputs an enable signal EN2 as an AND output to the priority determining unit 11-2.

The control register 15a stores the 8-bit allocation signal indicating which unit of the priority determining units 11-1 and 11-2 to receive an allocation of the eight bus request signals.

Further, the control register 15a stores a switching signal 16 for operating or stopping priority registers 17-1 and 17-2 incorporated into the priority determining units 11-1 and 11-2. The switching signal 16 consists of 2 bits. A bus data path is written via the bus 1 to the control register 15a.

Figure 9:
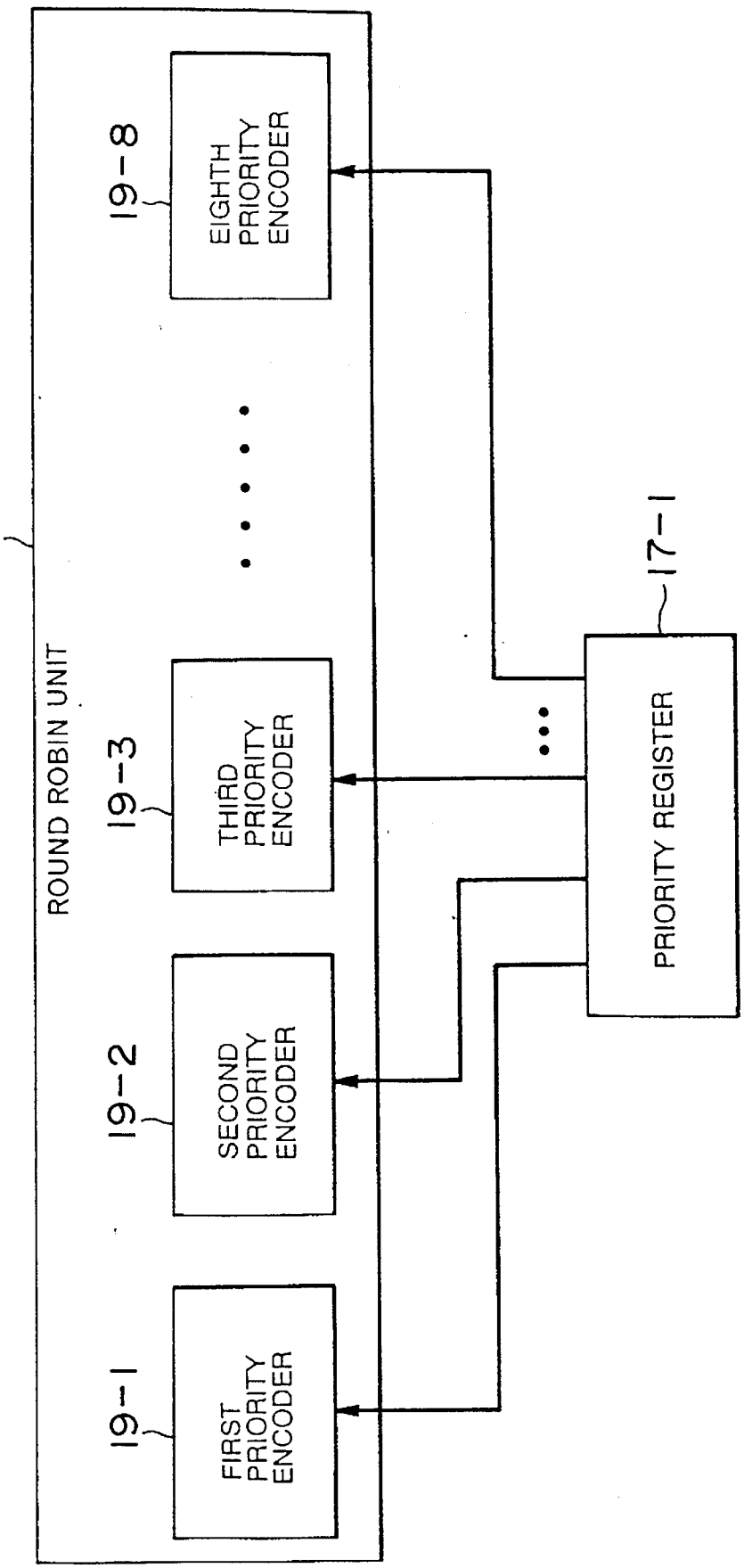
FIG. 9 is a block diagram illustrating a priority determining unit in the embodiment 2.

FIG. 9 is a diagram illustrating a configuration of the priority determining unit. The priority determining units 11-1 and 11-2 determine the priority of the bus among the bus masters by the round robin method.

The priority determining unit 11-1 is, as illustrated in FIG. 9, the priority register 17-1 and a round robin unit 19. The round robin unit 19 is constructed of eight sets of first to eighth priority encoders 19-1 to 19-8.

Note that the priority determining unit 11-2 is also constructed of the priority register 17-2 and the round robin unit 19.

Figure 10:
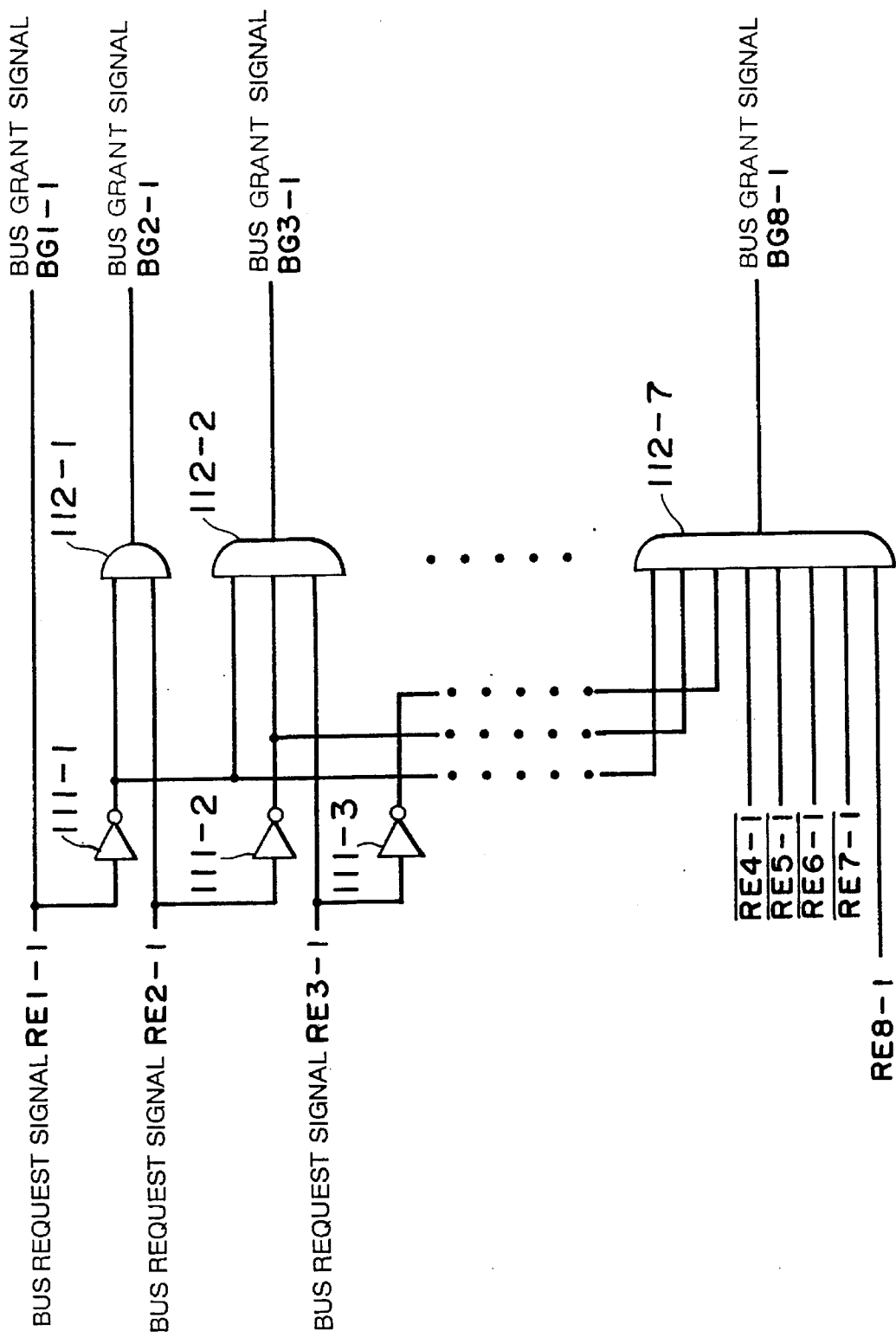
FIG. 10 is a diagram showing a first priority encoder.

FIG. 10 is a diagram depicting the first priority encoder. Shown in FIG. 10 is the first priority encoder 19 provided in the priority determining unit 11-1. Note that the first priority encoder 19-1 of FIG. 10 is, though not illustrated, provided also in the priority determining unit 11-2.

The first priority encoder 19-1 has an inverter 111-i and an AND gate 112-j, wherein i is a value of 1 through 8 and j is a value of 1 through 7.

The first priority encoder 19-1 gives a priority level to the bus request signal RE1-1. That is, the bus request signal RE1-1 is outputted unchanged as a bus grant signal BG1-1. The bus request signal RE8-1 is set in the lower-order.

The inverter 111-i inverts the bus request signal REi. The inverted output of the bus request signal RE1-1 by the inverter 111-1 and the bus request signal RE2-1 are ANDed by the AND gate 112-1. The AND gate 112-1 outputs the bus grant signal BG2-1 as an AND output to the bus service holding unit 12.

The AND gate 112-2 obtains the AND of the inverted output(an additional bar on the REi-1 in the FIG.10,i=1 to 7)

of the bus request signal RE1-1 by the inverter 111-1, the inverted output of the bus request signal RE2-1 by the inverter 111-2 and the bus request signal RE3-1. The AND gate 112-2 outputs the bus grant signal BG3-1 as an AND output to the bus service holding unit 12.

The AND gate 112-2 obtains the AND of the inverted output of the bus request signal RE1-1 by the inverter 111-1, the inverted output of the bus request signal RE2 by the inverter 111-2 and the bus request signal RE3-1. The AND gate 112-2 outputs the bus grant signal BG3-1 as an AND output to the bus service holding unit 12.

The AND gate 112-7 obtains the AND of the inverted output of the bus request signal RE1-1 (i=1 to 7) by the inverter 111-i and the bus request signal RE8-1. The AND gate 112-7 outputs the bus signal BG8-1 as an AND output to the bus service holding unit 12.

Figure 11:
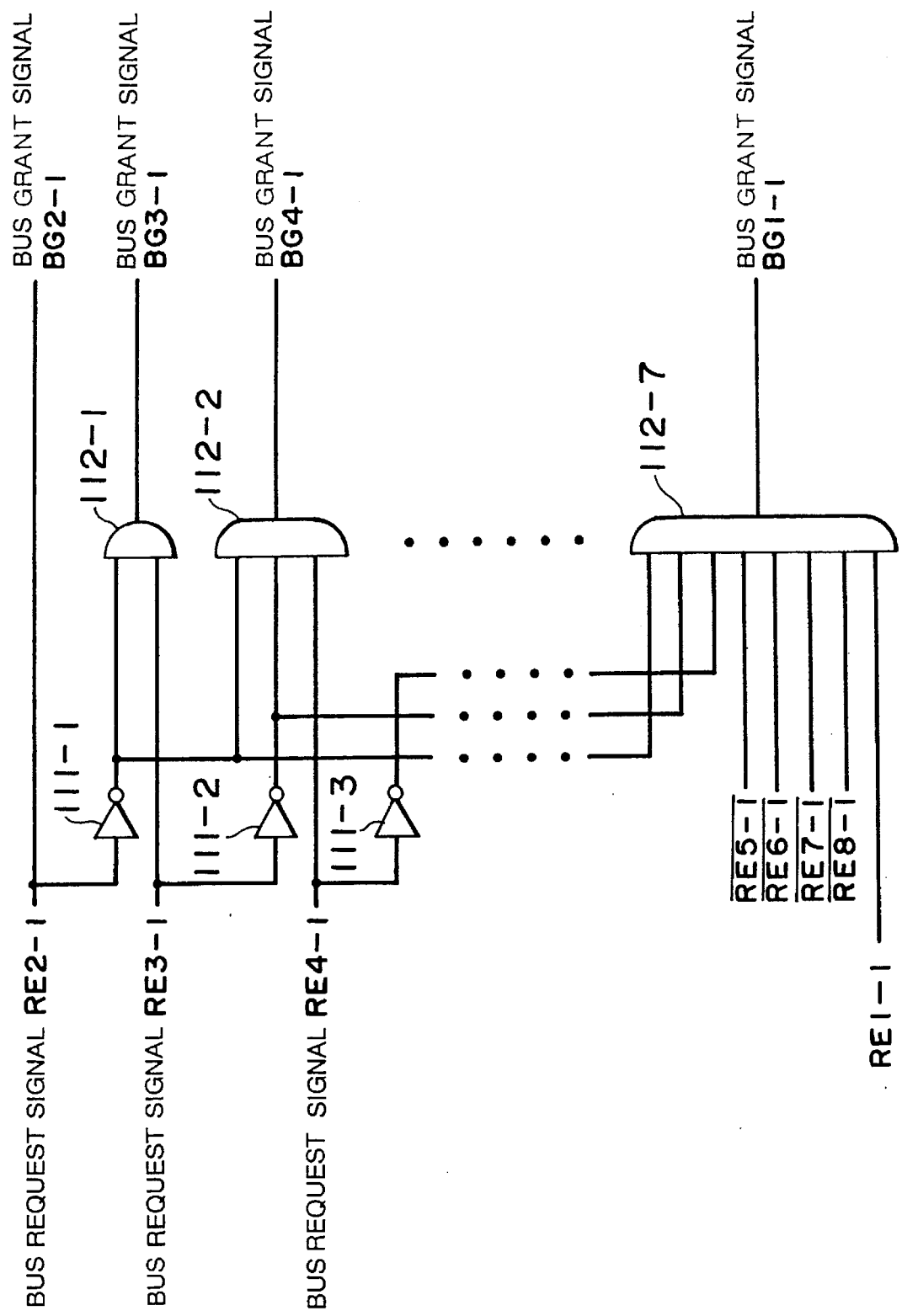
FIG. 11 is a diagram showing a second priority encoder.

FIG. 11 is a diagram illustrating the second priority encoder. The second priority encoder 19-2 gives a priority level to the bus request signal RE2-1.

That is, the bus request signal RE2-1 is outputted intact as a bus grant signal BG2-1. The bus request signal RE1-1 is set in the lower-order. The second priority encoder 19-2 is also constructed of the inverter 111-i and the AND gate 112-i.

Similarly, though not illustrated, an n-th priority encoder 19-n gives a priority level to a bus request signal REn-1. A bus request signal RE(n-1)-1 is set in the lowest-order, wherein n is a value of 3 through 8.

Any one of the eight priority encoders 19-1 to 19-8 is selected based on the values stored in the priority registers 17-1 and 17-2. The thus selected priority encoder makes a comparison in terms of the priority with respect to the individual bus request signals inputted thereto.

The values set in the priority registers 17-1 and 17-2 are determined by the AND of a set signal 18a supplied from the bus protocol control unit 18 and the enable signal (EN1 or EN2) from the enable unit 14.

The bus protocol control unit 18 outputs, as a set signal, the bus grant signal 18a of the bus master 2 which has used the bus 1 at the bus cycle one before to the priority registers 17-1 and 17-2 per bus cycle. The above bus grant signal is also called a bus grant.

Selected at the next bus cycle is such a priority encoder that the priority of the bus master 2 using the bus 1 at the bus cycle one before comes down to the lowest-order on the basis of the bus grant signals stored in the priority registers 17-1 and 17-2.

Further, the internal bus grant signal and a fixed value inputted as an initial value are multiplex-inputted to the priority registers 17-1 and 17-2 in order to store the bus grant signals, used at the previous bus cycle, of the bus master 2.

The eight sets of the first to eighth priority encoders 19-1 to 19-8 are individually selected in sequence by the values set in the priority registers, and, therefore, the round robin method is actualized.

Further, if the operations of the priority registers 17-1 and 17-2 are stopped, the priority registers 17-1 and 17-2 select only one priority encoder to realize the linear method.

Also, the bus protocol control unit 18 recognizes the bus cycle by monitoring the bus control signal. The bus protocol control unit 18 causes the bus service holding unit 12 to hold the bus grant signal and, at the same time, supplies a read signal 18a for reading the bus grant signal. The bus protocol control unit 18 outputs, to the control register 15a, a control register write signal 18a outputted by a bus access.

Figure 12:
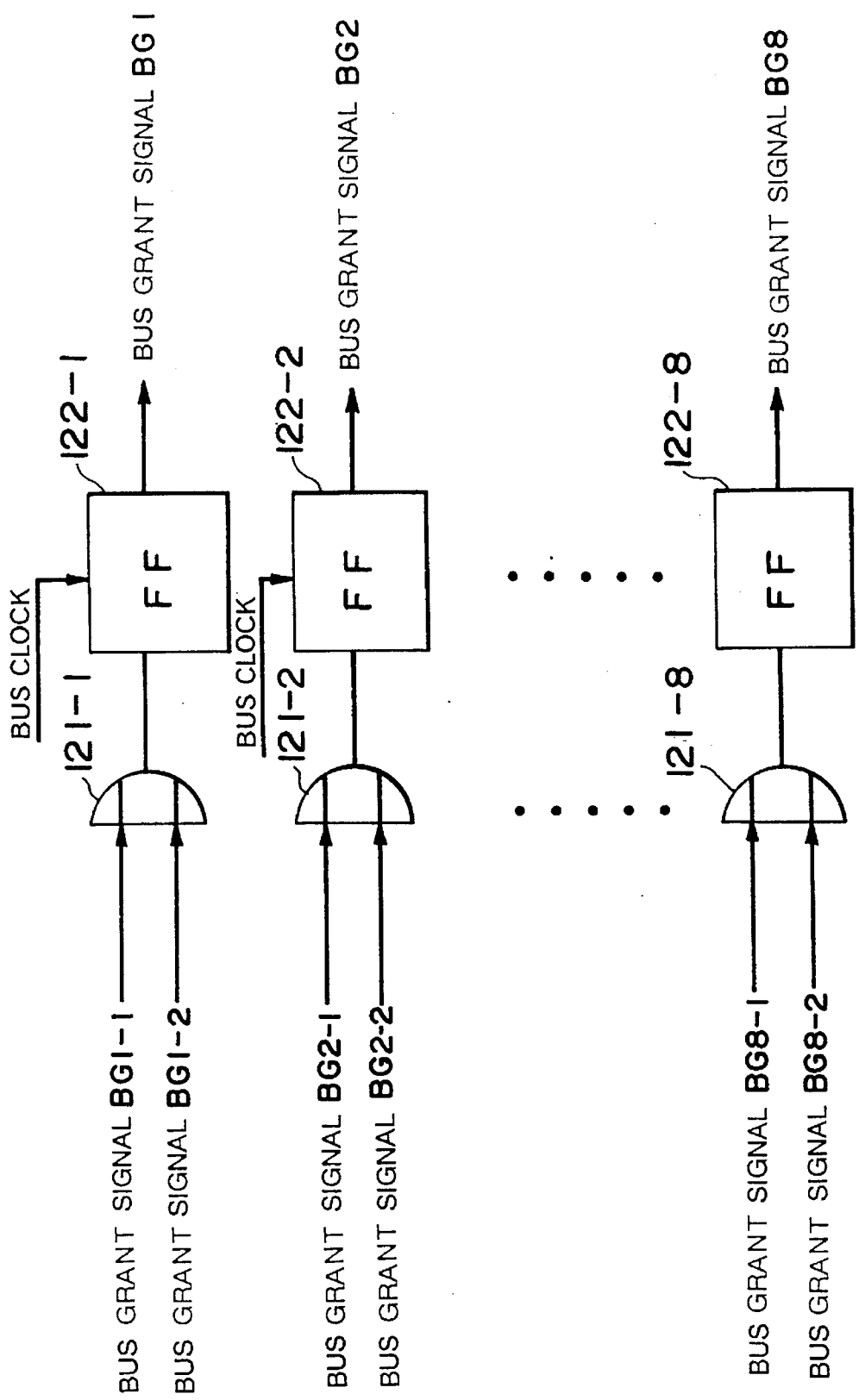
FIG. 12 is a block diagram illustrating a bus service holding unit in the embodiment 2.

FIG. 12 is a diagram illustrating a configuration of the bus service holding unit 12. The bus service holding unit 12 holds the bus grant signals supplied from the priority determining units 11-1 and 11-2.

Referring back to FIG. 10, the bus service holding unit 12 comprises eight pieces of OR gates 121-i (i=1 to 8) and a flip-flop (FF) 122-i.

The bus grant signals BGi-j supplied respectively from the priority determining units 11-1 and 11-2 are ORed by the OR gate 121-i, wherein i is a value of 1 to 8, and j is a value of 1 to 2.

The FF122-i obtains the bus grant signal BGi by an output of the OR gate 121-i and an input of a bus clock.

OPERATION OF EMBODIMENT 2

Figure 13:
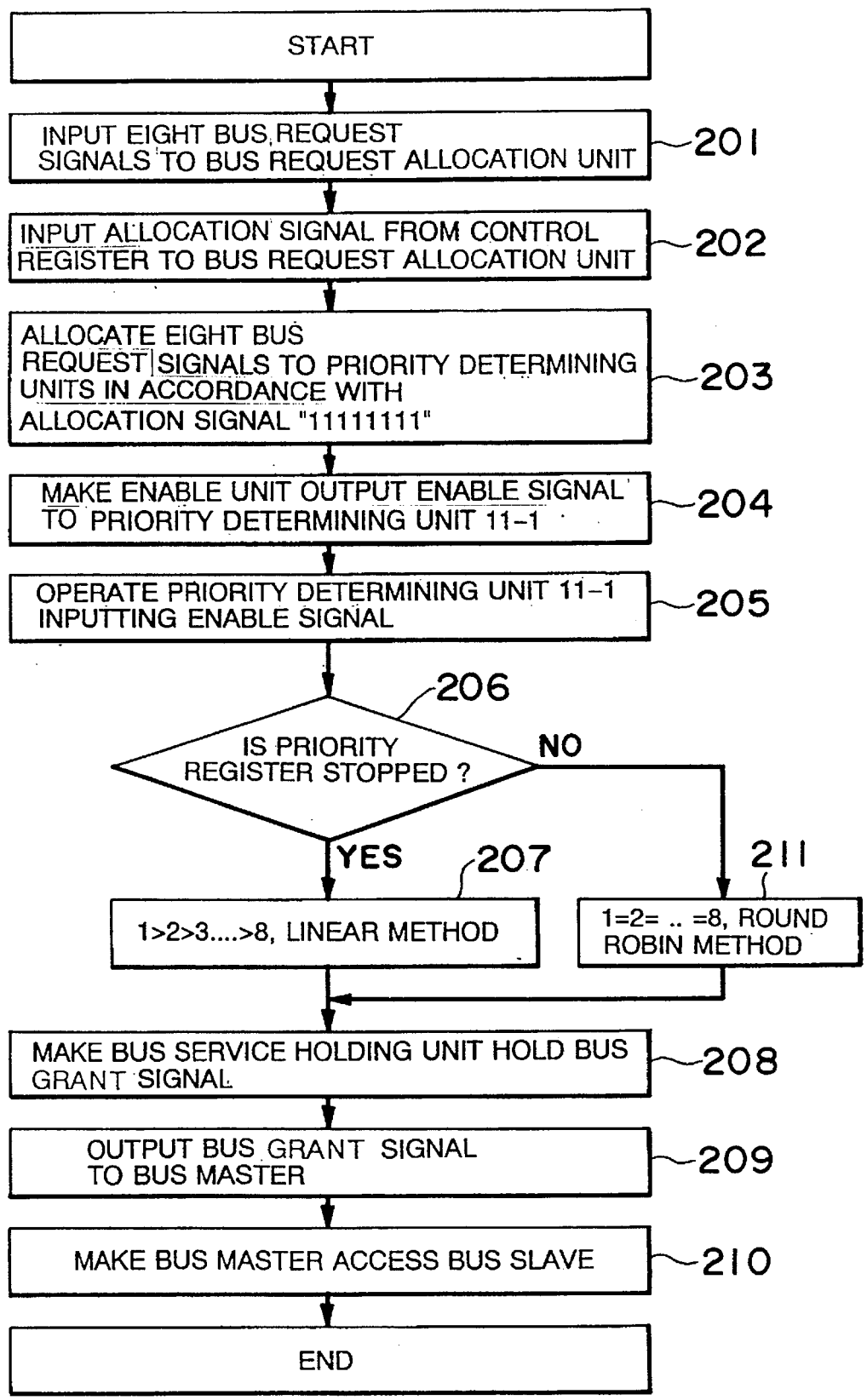
FIG. 13 is a flowchart showing the operation of the bus arbiter in accordance with the embodiment 2 of this invention.

Next, the operation of the thus constructed embodiment 2 of the present invention will be explained. FIG. 13 is a flowchart showing the operation of the embodiment 2 of this invention. The operation of the bus arbiter and the bus arbitrating method will be described with reference to this flowchart.

To start with, the bus request allocation unit 13 inputs the bus request signals from the eight bus masters 2-1 to 2-8, respectively (step 201). Inputted from the control register 15a to the bus request allocation unit 13 is the allocation signal 7 indicating which unit of the priority determining units 11-1 and 11-2 to receive the allocation of the bus request signals (step 202).

Herein, the 8-bit allocation signal 7 supplied from the control register 15a is, e.g., "11111111". The bus request signals REi (i=1 to 8) are simultaneously supplied to the bus request allocation unit 13, and, hence, the output of the AND gate 131-i1 becomes "1".

Accordingly, the eight bus request signals RE1-1 are outputted from the AND gate 131-i1 to the priority determining unit 11-1 (step 203).

On the other hand, when the 8-bit allocation signal 7 is, e.g., "00000000", the allocation signal 7 turns out "1"through the inverter 132-i. Then, the output of the AND gate 131-i2 becomes "1" because of the bus request signals REi and the output of the inverter 132-i.

Therefore, the bus request signals REi-2 are outputted from the AND gate 131-i2 to the priority determining unit 11-2.

Next, the bus request signals RE1-1 to RE8-1 supplied from the bus request allocation unit 13 are ORed by the OR gate 141 in the enable unit 14. An OR output is outputted as an enable signal EN1 to the priority determining unit 11-1 (step 204).

When the allocation signal 7 is, e.g., "11111111", all the bus request signals RE1-1 to RE8-1 are 1. The output of the OR gate 141, i.e., the enable signal EN1, becomes "1". The priority determining unit 11-1 is thereby operated (step 205).

In this case, the enable signal EN2 turns out "0" by the logic circuit 143. The priority determining unit 11-2 is thereby brought into a non-operative status.

Further, when the allocation signal 7 is, e.g., "000000000", all the bus request signals RE1-2 to RE8-2 are 1. The output of the OR gate 142, viz., the enable signal EN2, becomes "1". The priority determining unit 11-2 is thereby operated. In this instance, the priority determining unit 11-1 is in the non-operative status.

Then, only the operated priority determining unit determines the priority of the bus with respect to the individual bus masters. For example, when the allocation signal 7 is "11111111", the priority determining unit 11-1 operates. In this case, the 8-bit bus request signal is allocated to the priority determining unit 11-1.

Next, the priority determining unit 11-1 determines whether or not the operation of the priority register 17-1 is stopped by the switching signal transmitted from the control register 15a (step 206).

Hereat, the operation of the priority register 17-1 is stopped, in which case the priority determining units 11-1 and 11-2 prioritize the bus use among the bus masters 2-1 to 2-8 as follows (step 207):

1>2>3>4>5>6>7>8 where the sign of inequality (>) indicates that the bus use of each bus master has a priority level.

That is, when the operations of the priority registers 17-1 and 17-2 are stopped by the switching signals 16 stored in the control register 15a, values of the priority registers 17-1 and 17-2 turn out to be one fixed value.

In this instance, the priority registers 17-1 and 17-2 select only one priority encoder. Accordingly, the priority of the bus use with respect to the eight bus masters 2-1 to 2-8 does not circulate, resulting in the linear method.

For instance, the first priority encoder 19-1 shown in FIG. 10 is selected. The following is an explanation of the operation of the first priority encoder 19-1.

To begin with, the bus grant signal BG1-1 is prior to other bus grant signals on the basis of the bus request signal RE1-1. Next, after several bus cycles have elapsed, the bus request signal RE1-1 becomes "0". Hence, the output of the inverter 111-1 becomes "1".

The bus request signal RE2-1 and the output "1" of the inverter 111-1 are ANDed by the AND gate 112-1. An AND output thereof becomes "1". The bus grant signal BG2-1 is thereby prior to other bus grant signals.

Further, after next several bus cycles have elapsed, the bus request signals RE1-1 and RE2-1 turn out to be "0". Both of the outputs of the inverters 111-1 and 111-2 become "1".

The bus request signal RE3-1 and the outputs "1" of the inverters 111-1 and 111-2 are ANDed by the AND gate 112-2. An AND output thereof becomes "1". The bus grant signal BG3-1 is thereby prior to other bus grant signals. Namely, as shown in FIG. 10, the bus of the bus grant signals is prioritized in a sequence like this: BG1-1, BG2-1, BG3-1, BG4-1, BG5-1, BG6-1, BG7-1 and BG8-1. The linear method shown in FIG. 6 is actualized in this manner.

Further, in the bus service holding unit 12, the bus grant signal BGi-1 passes through the OR gate 121-i and is outputted to the FF122-i. The FF122-i stores the bus grant signal BGi-1 on the basis of the bus clock (step 208).

Then, when the bus grant signal BGi is outputted to the selected bus master 2-i (step 209), this bus master 2-i accesses the bus slave 3 (step 210). Further, the bus cycle is ended by an acknowledge response ACK given from the bus slave.

On the other hand, when the priority register 17-1 operates, the bus determining unit 11-1 sets the priority of the bus use by the round robin method as follows (step 211):

1=2=3=4=5=6=7=8 where the equal sign indicates that the bus use is evenly allocated to the respective bus masters in sequence.

That is, when the priority registers 17-1 and 17-2 operate by the switching signals stored in the control register 15a, the bus protocol control unit 18 outputs, as the set signal, the bus grant signal of the bus master 2 which has used the bus 1 at the bus cycle one before to the priority registers 17-1 and 17-2 at every bus cycle.

Any one of the eight priority encoders 19-1 through 19-8 is selected by the values stored in the priority registers 17-1 and 17-2.

At the first onset, the first priority encoder 19-1 is selected at the first bus cycle by an initial value of the priority registers 17-1 and 17-2. The first priority encoder 19-1 has the priority level with respect to the bus request signal RE1-1, and, therefore, the bus grant signal BG1-1 is outputted.

Selected next at the second bus cycle is such a second priority encoder 19-2 that the priority of the bus master 2-1 using the bus 1 at the bus cycle one before comes down to the lowest-order on the basis of the bus grant signals BG1-1 stored in the priority registers 17-1 and 17-2.

The second priority encoder 19-2 has the priority level with respect to the bus request signal RE2-1, and, hence, the bus grant signal BG2-1 is outputted.

Selected further at the third bus cycle is such a third priority encoder 19-3 that the priority of the bus master 2—2 using the bus 1 at the bus cycle one before comes down to the lowest-order on the basis of the bus grant signals BG2-1 stored in the priority registers 17-1 and 17-2.

The third priority encoder 19-3 has the priority level with respect to the bus request signal RE3-1, and, hence, the bus grant signal BG3-1 is outputted.

Thus, the eight sets of the first through eighth priority encoders 19-1 to 19-8 are individually selected in sequence per bus cycle by the values set in the priority registers.

With this operation, the bus circulates among the eight bus masters 2-1 to 2-8, and therefore the round robin method shown in FIG. 5 is realized.

In this way, the priority of the bus use is evenly allocated to the respective bus masters. That is, the linear method is switched to the round robin method.

With this processing, both of the normal linear method and the round robin method are properly selected by switching the operation and the stop of the priority register 17-1.

Accordingly, the priority of the bus use can be set in the programmable manner. For this reason, the number of the bus masters and the physical connecting positions of the bus masters are not limited.

Also, the bus arbiter is capable of, if the computer system is changed, corresponding to that computer system. The bus arbiter, further, can be diverted to other computer systems.

Note that the embodiment 2 has dealt with the processing of steps 206 through 211 when the priority determining unit 11-1 operates by the allocation signal 7 "11111111".

For instance, in step 205, the priority determining unit 11-2 may be operated by, e.g., an allocation signal 7 "00000000". In this case, the 8-bit bus request signals are allocated to the priority determining unit 11-2, and the processing of steps 206 to 211 is performed.

EMBODIMENT 3

Next, the bus arbiter in accordance with an embodiment 3 of this invention will be discussed. In the embodiment 3, the priority level of the bus use of one specified bus master is increased, and, at the same time, the bus use is evenly allocated to other bus masters.

Figure 14:
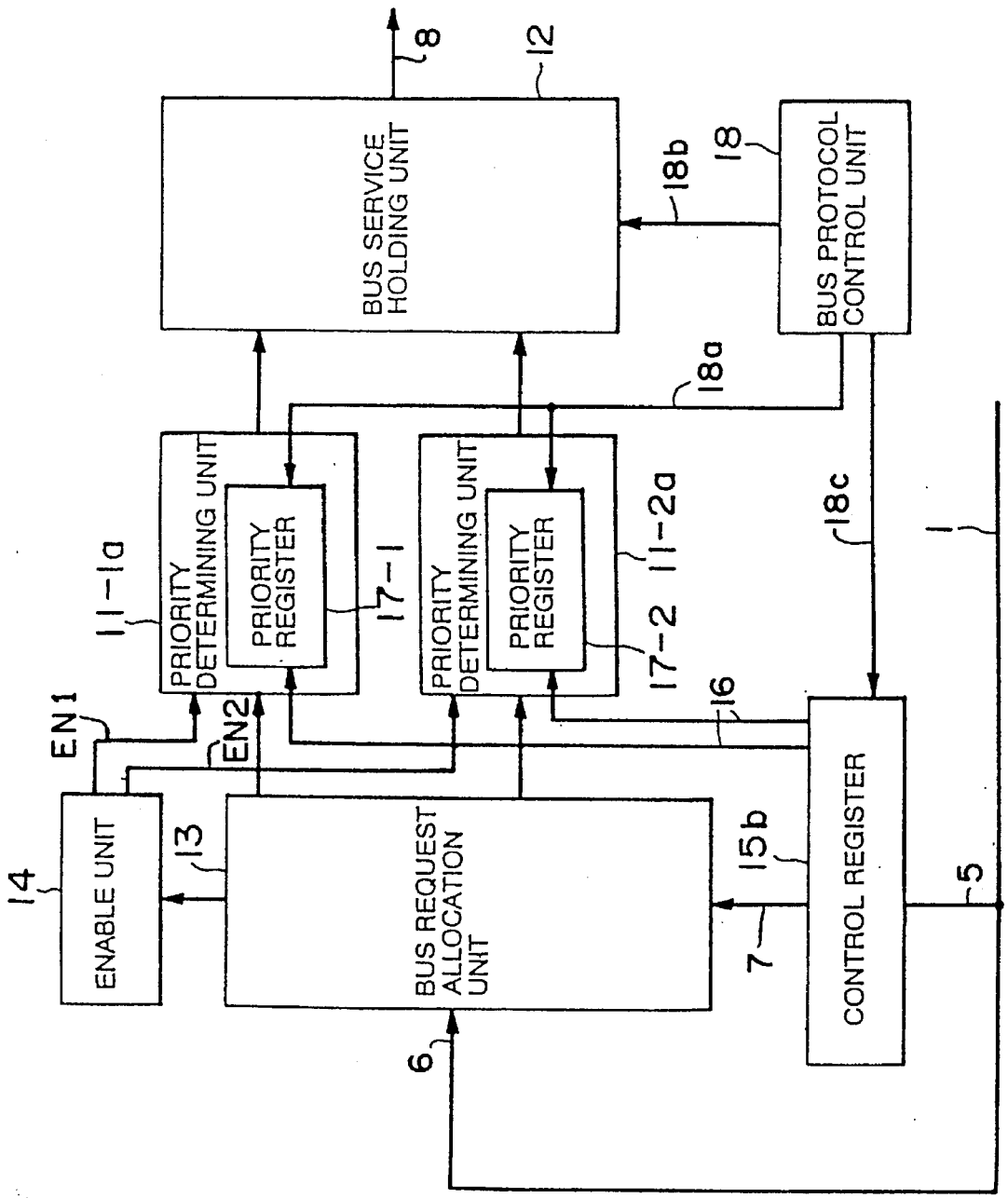
FIG. 14 is a block diagram illustrating a configuration of the bus arbiter in accordance with an embodiment 3 of this invention.

FIG. 14 is a block diagram illustrating a configuration of the bus arbiter in accordance with the embodiment 3 of the present invention. The bus arbiter includes the bus request allocation unit 13, the enable unit 14, a control register 15b and priority determining units 11-1a and 11-2a. The bus arbiter further includes the bus service holding unit 12 and the bus protocol control unit 18.

The control register 15b stores an allocation signal 7 of "00100000", wherein the third bit "1" is provided for selecting the bus master 2-3.

The bus request allocation unit 13 allocates the bus request signal RE3-1 to the priority determining unit 11-1a in response to the allocation signal from the control register 15b. The bus request allocation unit 13 allocates the bus request signals RE1-2, RE2-2, RE4-2, RE5-2, RE6-2, RE7-2 and RE8-2 to the priority determining unit 11-2a.

The priority determining unit 11-1a sets the priority level of the bus use of the bus master 2-3 higher than those of all other bus masters 2-1, 2—2, 2-4 through 2-8.

The bus priority determining unit 11-2a evenly allocates the bus use to other bus masters 2-1, 2—2, 2-4 through 2-8.

The priority register 17-1 is brought into the nonoperative status by a switching signal 16 of '0' from the control register 15b. The priority register 17-2 is operated by a switching signal 16 of '1' from the control register 15b.

Other configurations are the same as those in the embodiment 2. The same units as those in the embodiment 2 are marked with the like symbols, and their explanations will be omitted.

Figure 15:
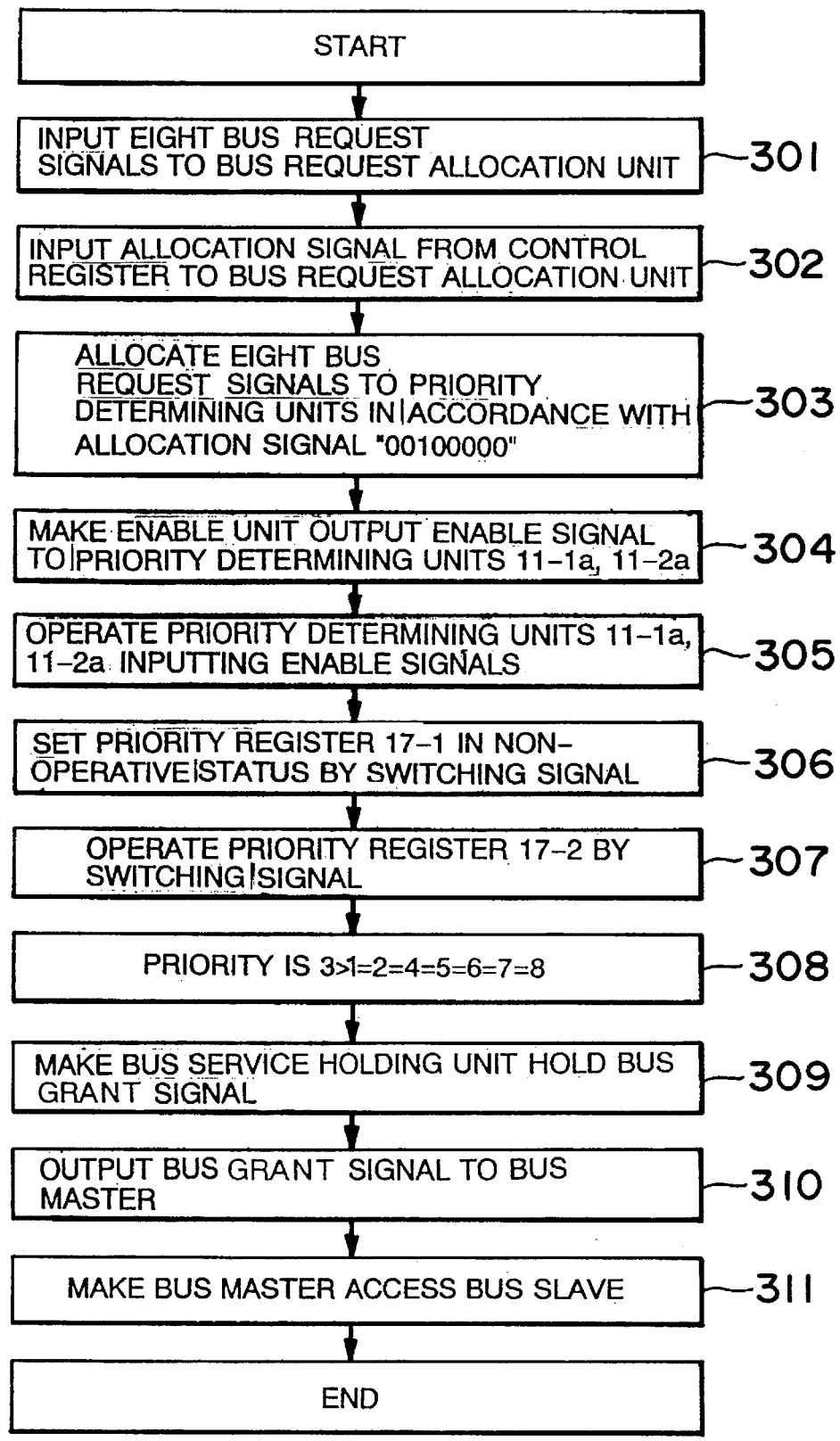
FIG. 15 is a flowchart showing the operation of the bus arbiter in accordance with the embodiment 3 of this invention.

FIG. 15 is a flowchart showing the operation of the bus arbiter in accordance with the embodiment 3 of the present invention. The operation of the embodiment 3 will be explained with reference to FIG. 15. The operation of the bus arbiter and the bus arbitrating method will be described referring to this flowchart.

First, the bus request allocation unit 13 inputs the bus request signals from the eight bus masters 2-1 to 2-8, respectively (step 301). Then, the bus request allocation unit 13 inputs the allocation signal 7 of "00100000" from the control register 15b (step 302).

Thereupon, outputs of AND gates 131-12, 131-22, 131-42, 131-52, 131-62, 131-72 and 131-82 become "1" due to the allocation signal 7 of "00100000". An output of the AND gate 131-31 turns out "1".

The bus request signal RE3-1 is thereby allocated to the priority determining unit 11-1. The bus request signals RE1-2, RE2-2, RE4-2, RE5-2, RE6-2, RE7-2 and RE8-2 are allocated to the priority determining unit 11-2 (step 303).

Next, in the enable unit 14, the OR gate 141 outputs the bus request signal RE3-1 supplied from the bus request allocation unit 13 as an enable signal EN1 to the priority determining unit 11-1a.

On the other hand, the OR gate 142 obtains the OR of the bus request signals RE1-2, RE2-2, RE4-2, RE5-2, RE6-2, RE7-2 and RE8-2 supplied from the bus request allocation unit 13.

The logic circuit 143 outputs the enable signal EN2 to the priority determining unit 11-2a only when the bus request signal RE3-1 is not inputted (step 304).

Next, the priority determining unit 11-1a operates for bus master 2-3 by the enable signal EN1. When the bus request signal RE-3 is inputted, the operation of the priority determining unit 11-2a is stopped. The priority determining unit 11-2a operates for other masters, when the bus request signal RE-3 is not inputted.

Next, the priority determining unit 11-1a sets the priority level of the bus of the bus master 2-3 higher than those of all other bus masters 2-1, 2—2, 2-4 through 2-8.

Herein, the priority register 17-1 comes into the nonoperative status by the switching signal 16 of '0' given from the control register 15b (step 306). Then, only the priority encoder 19-3 explained in the embodiment 2 is employed.

On the other hand, the priority register 17-2 operates due to the switching signal '1' transmitted from the control register 15b (step 307). Hereat, the priority encoders 19-1, 19-2, 19-4 to 19-8 are sequentially selected per bus cycle according to the values stored in the priority register 17-2.

That is, the bus priority determining unit 11-1b evenly allocates the bus use to the bus masters 2-1, 2—2, 2-4 through 2-8.

With this allocation, of the bus use is prioritized like this: 3>1=2=4=5=6=7=8

Namely, the priority of the bus use is set in the programmable manner. Further, the bus use is flexibly allocated. The third embodiment involves the use of a combination of the two systems, i.e., the linear method and the round robin method.

The priority of the bus use of the bus master undergoing, especially, a time-constraint in terms of data transfer is set high by the priority determining unit 11-2a. The priority determining unit 11-2b evenly allocates the right to use the bus to other bus masters.

With this operation, there is eliminated such a case that the bus master subjected to, particularly, the time-constraint waits long. Further, the bus arbiter does not undergo a limit in terms of the number of bus masters and the physical positions but is, besides, capable of corresponding to a case where the computer system is changed.

Moreover, in the bus service holding unit 12, the bus grant signal BGi-1 and the bus grant signal BGi-2 are ORed by the OR gate 121-i. The FF122-i stores the bus grant signal BGi as an OR output on the basis of the bus clock (step 309).

Then, when the bus grant signal BGi is outputted to the selected bus master 2-i (step 310), the bus master 2-i accesses the bus slave 3 (step 311). Moreover, the bus cycle is terminated by the acknowledge response ACK from the bus slave.

Note that the present invention is not limited to the embodiments 1 through 3 discussed above. The number of bus masters is not confined to the number explained in the embodiment, and, besides, the way of setting the allocation signal 7 is not limited to that taken in the embodiment.

EMBODIMENT 4

Figure 16:
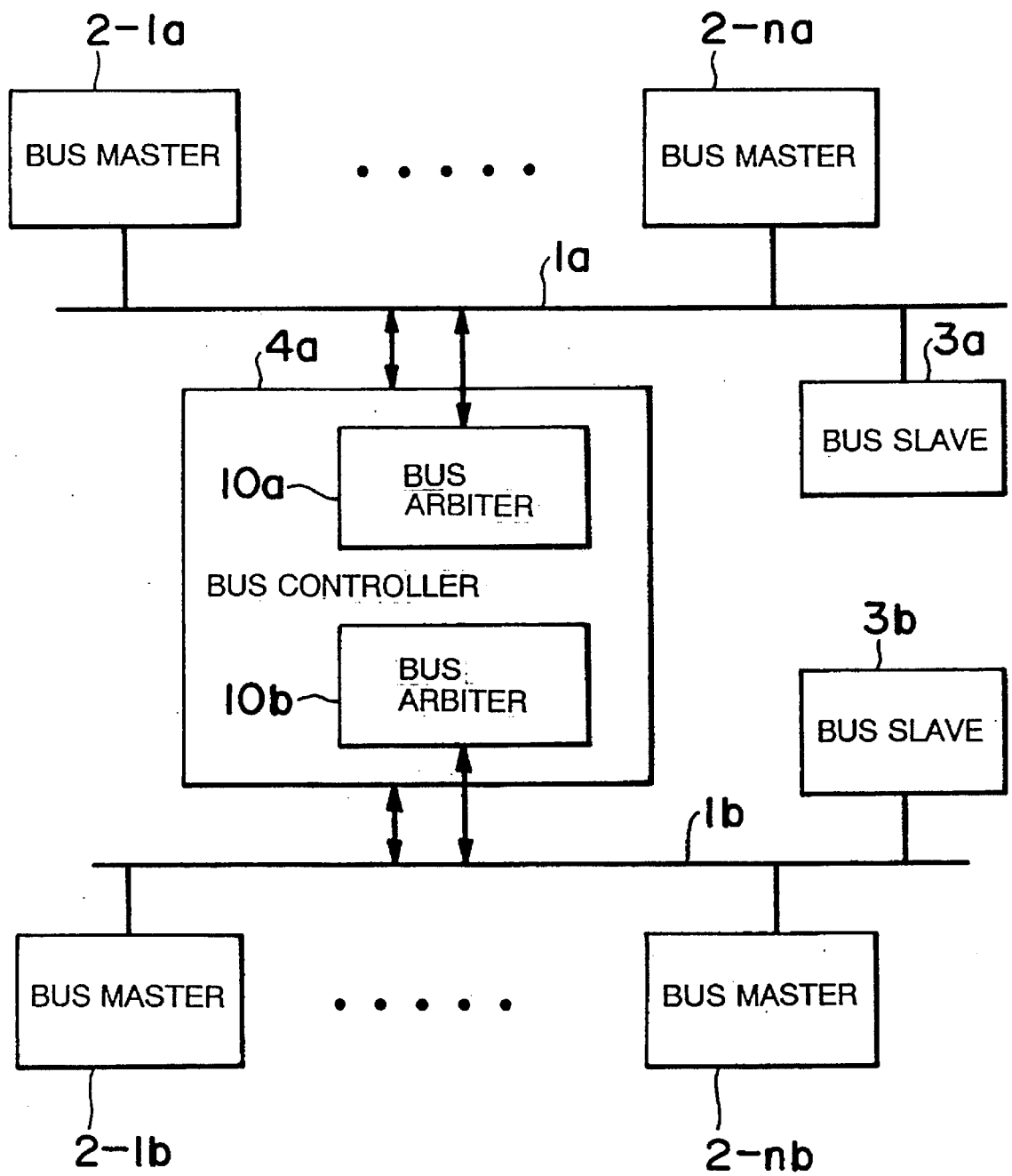
FIG. 16 is a block diagram illustrating a configuration of the bus control system including the bus controller in accordance with an embodiment 4 of this invention.

Next, an embodiment 4 of the present invention will be discussed. The embodiment 4 is concerned with the bus control system inclusive of the bus controller. FIG. 16 is a view illustrating a configuration of the bus control system including the bus controller in accordance with the embodiment 4 of this invention.

Referring to FIG. 16, the bus control system is provided with two lines of buses 1a and 1b. Bus masters 2-1a to 2-na and a bus slave 3a are connected to the bus 1a. Bus masters 2-1b to 2-nb and a bus slave 3b are connected to the bus 1b.

A bus controller 4a is connected to the two buses 1a and 1b. The bus controller 4a has two bus arbiters 10a and 10b. The bus arbiter 10a arbitrates the bus 1a among the bus masters 2-1a through 2-na.

The bus arbiter 10b is connected to the bus 1b. The bus arbiter 10b arbitrates the bus 1b among the bus masters 2-1b through 2-nb.

The configuration of each of the bus arbiters 10a and 10b is the same as that of the bus arbiter 10 explained in the embodiment 2.

As described above, the plurality of bus arbiters are incorporated into the bus controller 4a, the present invention is applicable to each bus arbiter.

It is apparent that, in this invention, a wide range of different working modes can be formed based on the invention without deviating from the spirit and scope of the invention. This invention is not restricted by its specific working modes except being limited by the appended claims.

What is claimed is:

1. A bus arbiter for arbitrating a bus among a plurality of bus masters based on bus request signals supplied from the bus masters and outputting a bus grant signal to a selected bus master acquiring the bus, comprising:

a plurality of priority determining means for determining a priority of bus use among the bus masters based on the bus request signals from the bus masters and generating the bus grant signal based on the priority;

bus request allocating means for allocating the bus request signals to said priority determining means based on an allocation signal indicating at least one selected priority determining means, among said plurality of priority determining means, to receive an allocation of the bus request signals from the bus masters; and control means for supplying the allocation signal to said bus request allocating means, operating the at least one selected priority determining means based on the allocation signal, said control means including enable means for generating an enable signal indicating an operation of the at least one selected priority determining means based on the bus request signals allocated from said bus request allocating means.

2. A bus arbiter according to claim 1, further comprising bus service holding means for holding the bus grant signal supplied from the at least one selected priority determining means operated by said control means and outputting the bus grant signal to the selected bus master acquiring the bus.

3. A bus arbiter for arbitrating a bus among a plurality of bus masters based on bus request signals supplied from the bus masters and outputting a bus grant signal to a selected bus master acquiring the bus, comprising:

a plurality of priority determining means for determining a priority of bus use among the bus masters based on the bus request signals from the bus masters and generating the bus grant signal based on the priority;

bus request allocating means for allocating the bus request signals to said priority determining means based on an allocation signal indicating at least one selected priority determining means, among said plurality of priority determining means, to receive an allocation of the bus request signals from the bus masters; and control means for supplying the allocation signal to said bus request allocating means, operating the at least one selected priority determining means based on the allocation signal, said control means including control storage means for storing items of bit data corresponding to a data quantity of the bus request signals as the allocation signal and for designating a corresponding priority determining means for each bus request signal to be allocated based on a value of each bit.

4. A bus arbiter according to claim 3 wherein each of said plurality of priority determining means includes:

priority storage means for storing priority data for evenly allocating the priority of bus use to the plurality of bus masters; and round robin means for evenly allocating the bus grant signal to the bus masters at every cycle based on the priority data stored in said priority storage means.

5. A bus arbiter according to claim 4, wherein said priority storage means stores, as an item of priority data, the bus grant signal for the bus master using the bus at a previous bus cycle.

6. A bus arbiter according to claim 5, wherein said round robin means is constructed of priority encoders equal in number to the bus masters, and wherein each of said priority encoders has a priority level defining the priority of bus use of a matching bus master corresponding thereto, to be sequentially selected based on the bus grant signal at the previous bus cycle which is stored in said priority storage means.

7. A bus arbiter according to claim 6, wherein at a current bus cycle, there is a newly selected bus master and the priority of the selected bus master previously selected comes down to a lowest priority.

8. A bus arbiter according to claims 6, wherein said control storage means, further stores a switching signal for switching between a round robin operation of sequentially selecting each of said plurality of priority encoders provided in said round robin means in each of said priority determining means and a linear operation of fixedly selecting any one of said priority encoders, and wherein said priority storage means performs an operation corresponding to the switching signal.

9. A bus arbiter according to claim 8, wherein said plurality of priority determining means comprise:

a first priority determining means for evenly allocating the priority of bus use to the bus masters corresponding to the bus request signals by the allocation signal in accordance with the round robin operation based on the switching signal; and a second priority determining means for allocating the priority of bus use to the bus masters corresponding to the bus request signals by the allocation signal in accordance with the linear operation based on the switching signal.

10. A bus arbitrating method of arbitrating a bus among a plurality of bus masters based on bus request signals supplied from the bus masters and outputting a bus grant signal to a selected bus master acquiring the bus, comprising the steps of:

(a) determining in a plurality of priority determining units a priority of bus use among the bus masters based on the bus request signals from the bus masters;

(b) generating the bus grant signal based on said determining in step (a);

(c) allocating the bus request signals to the priority determining units based on an allocation signal indicating at least one selected priority determining unit among the priority determining units, to receive an allocation of the bus request signals from the bus masters;

(d) generating the allocation signal;

(e) operating the at least one selected priority determining unit based on the allocation signal; and (f) generating an enable signal indicating an operation of the at least one selected priority determining unit based on the bus request signals to be allocated.

11. a bus arbitrating method according to claim 10 further comprising a holding step of holding the bus grant signal supplied from the at least one selected priority determining unit and outputting the bus grant signal to the selected bus master acquiring the bus.

12. A bus arbitrating method arbitrating a bus among a plurality of bus masters based on bus request signals supplied from the bus masters and outputting a bus grant signal to a selected bus master acquiring the bus, comprising the steps of:

(a) determining in a plurality of priority determining units a priority of bus use among the bus masters based on the bus request signals from the bus masters;

(b) generating the bus grant signal based on said determining in step (a);

(c) allocating the bus request signals to the priority determining units based on an allocation signal indicating at least one selected priority determining unit, among the priority determining units, to receive an allocation of the bus request signals from the bus masters;

(d) generating the allocation signal;

(e) operating the at least one selected priority determining unit based on the allocation signal;

(f) storing items of bit data corresponding to a data quantity of the bus request signals as the allocation signal; and (g) designating one of the priority determining units to which each bus request signal should be allocated based on a value of each bit.

13. A bus arbitrating method according to claim 12, wherein said determining in step (a) includes:

(a1) storing in a priority storage unit priority data for evenly allocating the priority of bus use to the bus masters; and (a2) evenly allocating in a round robin unit the bus grant signal to the bus masters at every cycle based on the priority data stored in said priority storage unit.

14. A bus arbitrating method according to claim 13, wherein said priority storing step involves storing, as an item of priority data, the bus grant signal for the bus master using the bus grant signal at a previous bus cycle.

15. A bus arbitrating method according to claim 14, wherein said round robin unit is constructed of priority encoders equal in number to the bus masters, and wherein each of said priority encoders has a priority level defining the priority of bus use of a matching bus master corresponding thereto, and wherein said allocating in step (a2) sequentially selects one of the bus masters based on the bus grant signal stored at the previous bus cycle.

16. A bus arbitrating method according to claim 15, wherein said allocating in step (a2) selects a new bus master at a current bus cycle and the selected bus master previously selected comes down to a lowest priority.

17. A bus arbitrating method according to claim 15, wherein said storing in step further stores a switching signal for switching between a round robin operation of sequentially selecting each of the priority encoders provided in each of the priority determining units and a linear operation of fixedly selecting any one of the priority encoders, and wherein said bus arbitrating method further comprises the step of (h) performing by the priority storage unit an operation corresponding to the switching signal.

18. A bus arbitrating method according to claim 17, wherein said allocating in step (c) evenly allocates the priority of bus use by a first priority determining unit to the bus masters corresponding to the bus request signals by the allocation signal in accordance with the round robin operation based on the switching signal, and allocates the priority of bus use by a second priority determining unit to the bus masters corresponding to the bus request signals by the allocation signal in accordance with the linear operation based on the switching signal.

* * * * *

UNITED STATES PATENT AND TRADEMARK OFFICE
CERTIFICATE OF CORRECTION

PATENT NO. : 5,583,999
DATED : December 10, 1996
INVENTOR(S) : Masami SATO, et al.

It is certified that error appears in the above-indentified patent and that said Letters Patent is hereby corrected as shown below:

TITLE PAGE [73] ASSIGNEE

"Fujitsu Limited, Kawasaki, Japan" should be --PFU Limited, Ishikawa Japan and Fujitsu Limited, Kawasaki, Japan--.

Column 7
    Line 45, "bus among" should be --bus use among--.

Column 8
    Line 26, "signal" should be --signal 7--;
    Line 34, "path" should be --path 5--.

Column 9
    Line 65, "signal 18a" should be --signal 18b--;
    Line 67, "signal 18a" should be --signal 18c--.

Column 12
    Line 47, "signal 7" should be --signal 7 of--;
    Line 49, "signal 7" should be --signal 7 of--.

Signed and Sealed this

Twenty-fourth Day of June, 1997

*Attest:*

BRUCE LEHMAN

*Attesting Officer*     *Commissioner of Patents and Trademarks*